United States Patent
Reese et al.

(10) Patent No.: US 7,408,656 B2
(45) Date of Patent: Aug. 5, 2008

(54) CONTROLLING PRINTER MACRO USAGE BASED ON PRINTER IDENTIFICATION INFORMATION

(75) Inventors: Curtis Reese, Boise, ID (US); Brett A. Green, Meridian, ID (US); John R. Hatten, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 968 days.

(21) Appl. No.: 10/385,021

(22) Filed: Mar. 10, 2003

(65) Prior Publication Data

US 2004/0179215 A1    Sep. 16, 2004

(51) Int. Cl.
*G06F 15/00* (2006.01)
(52) U.S. Cl. .................. 358/1.11; 358/1.14; 358/1.15
(58) Field of Classification Search ............ 358/1.11, 358/1.14, 1.15
See application file for complete search history.

(56) References Cited

U.S. PATENT DOCUMENTS

| | | | | |
|---|---|---|---|---|
| 4,612,532 A * | 9/1986 | Bacon et al. ............ | 341/51 |
| 4,883,291 A | 11/1989 | Robertson | |
| 5,034,770 A * | 7/1991 | O'Connell ............ | 399/79 |
| 5,239,621 A | 8/1993 | Brown, III et al. | |
| 5,390,297 A * | 2/1995 | Barber et al. ............ | 726/29 |
| 5,522,028 A * | 5/1996 | Nagata et al. ............ | 358/1.11 |
| 5,533,174 A | 7/1996 | Flowers, Jr. et al. | |
| 5,542,050 A * | 7/1996 | Onozawa ............ | 358/1.11 |
| 5,550,932 A * | 8/1996 | Blaylock et al. ......... | 382/139 |
| 5,729,666 A | 3/1998 | Konsella et al. | |
| 5,933,584 A * | 8/1999 | Maniwa ............ | 358/1.15 |
| 6,184,880 B1 * | 2/2001 | Okada ............ | 715/704 |
| 6,252,671 B1 * | 6/2001 | Peng et al. ............ | 358/1.11 |
| 6,379,058 B1 * | 4/2002 | Petteruti et al. ............ | 400/76 |
| 6,381,030 B1 * | 4/2002 | Udagawa et al. ............ | 358/1.14 |
| 6,426,798 B1 * | 7/2002 | Yeung ............ | 358/1.13 |
| 6,727,997 B1 * | 4/2004 | Miller ............ | 358/1.11 |
| 6,856,317 B2 * | 2/2005 | Konsella et al. ............ | 345/471 |
| 6,974,917 B2 * | 12/2005 | Hattori et al. ............ | 178/18.01 |
| 7,098,898 B2 * | 8/2006 | Hattori et al. ............ | 345/173 |
| 7,117,180 B1 * | 10/2006 | Stefik et al. ............ | 705/51 |
| 2002/0136578 A1 | 9/2002 | Johnson et al. | |
| 2002/0181001 A1 | 12/2002 | Klosterman et al. | |
| 2003/0009483 A1 | 1/2003 | Reese | |

(Continued)

FOREIGN PATENT DOCUMENTS

EP    0480593    4/1992

(Continued)

OTHER PUBLICATIONS

Microsoft Press Computer Dictionary.—3rd ed.☐☐ISBN 1-57231-446-X☐☐I. Microsoft Preess. QA76.15.M54 1997.*

(Continued)

*Primary Examiner*—Twyler L. Haskins
*Assistant Examiner*—Pawandeep S Dhingra

(57) ABSTRACT

A method of controlling usage of printer macros stored in a printer includes detecting a request for use of a first one of the printer macros by a print job. Printer identification information contained in the first printer macro is compared to a printer identifier stored in the printer. Usage of the first printer macro by the printer is controlled based on the comparison.

24 Claims, 10 Drawing Sheets

U.S. PATENT DOCUMENTS

| | | | |
|---|---|---|---|
| 2003/0023764 A1 | 1/2003 | Reese et al. | |
| 2004/0041840 A1* | 3/2004 | Green et al. | 345/776 |
| 2004/0075856 A1* | 4/2004 | Lay et al. | 358/1.13 |
| 2004/0134370 A1* | 7/2004 | Katamoto et al. | 101/484 |
| 2004/0141190 A1* | 7/2004 | Akashi | 358/1.6 |
| 2004/0184043 A1* | 9/2004 | Hirosugi et al. | 358/1.1 |
| 2004/0207627 A1* | 10/2004 | Konsella et al. | 345/471 |
| 2004/0254955 A1* | 12/2004 | Reese et al. | 707/104.1 |
| 2004/0254987 A1* | 12/2004 | Konsella et al. | 709/206 |
| 2005/0021970 A1* | 1/2005 | Reese et al. | 713/176 |
| 2005/0062996 A1* | 3/2005 | Yamanaka | 358/1.11 |
| 2005/0094173 A1* | 5/2005 | Engelman et al. | 358/1.11 |
| 2006/0069824 A1* | 3/2006 | Hodder | 710/72 |

FOREIGN PATENT DOCUMENTS

| | | | |
|---|---|---|---|
| JP | 64-082128 | | 3/1989 |
| JP | 04191063 A | * | 7/1992 |
| JP | 05-224914 | | 9/1993 |
| JP | 10-240474 | | 9/1998 |
| JP | 2001-309099 | | 11/2001 |
| JP | 2002-312053 | | 10/2002 |

OTHER PUBLICATIONS

Microsoft Press Computer Dictionary 3rd Edition. ISBN 1-57231-446-X Microsoft Press, QA76.15.M54 1997.*

European Search Report for Application No. EP04250974.5-1245. Report issued Oct. 18, 2006.

Hewlett-Packard webpage entitled "HP LaserJet Printers—PCL (Printer Command Language)"; 4 pgs.; 1998.

Hewlett-Packard webpage entitled "HP LaserJet Printers—HP Secure Font Box"; 2 pgs.; 2001.

Electronic Forms Plus, Inc. webpage entitled "Electronic Forms"; 1 pg.; Sep. 19, 2002.

Electronic Forms Plus, Inc. webpage entitled "Integrating Form Overlays Directly into Applications—Using Printer-Resident Forms"; 8 pgs; Nov. 1, 2002.

Electronic Forms Plus Inc. webpage entitled "HP PCL Printer Control Language"; 8 pgs; Feb. 28, 2003.

* cited by examiner

| Command | Description |
|---|---|
| Esc&f0X | Start macro definition |
| Esc&f1X | Stop macro definition |
| Esc&f2X | Execute macro |
| Esc&f3X | Call macro |
| Esc&f4X | Enable macro for automatic overlay |
| Esc&f5X | Disable automatic overlay |
| Esc&f6X | Delete all macros |
| Esc&f7X | Delete all temporary macros |
| Esc&f8X | Delete macro |
| Esc&f9X | Make macro temporary |
| Esc&f10X | Make macro permanent |

Fig. 2

| | | |
|---|---|---|
| | 302A | 302B |
| 304A | Esc&f1Y | Specify the Macro ID as 1 |
| 304B | Esc&f0X | Start the Macro Definition |
| 304C | Esc&a540h360V | Position logo at (540,360) decipoints in the coordinate system |
| 304D | Esc*t150R | Set graphics resolution to 150 dots-per-inch |
| 304E | Esc*r1A | Start raster image of logo |
| 304F | Esc*b60W [Raster data] | Send the first raster line |
| 304G | ... | |
| 304H | ... | |
| 304I | Esc*b60W [Raster data] | Send the last raster line |
| 304J | Esc*rC | Stop raster graphics |
| 304K | Esc&a540h780V | Position for lettering at (540,780) decipoints |
| 304L | Esc(1X | Select font with ID of 1 |
| 304M | ABC Corp. | Text |
| 304N | Post Office Box 15 | Text |
| 304O | Fred, Texas 83707 | Text |
| 304P | Esc&a540h960V | Position first rule at (540,960) decipoints |
| 304Q | Esc*c10v4680H | Set rule height and width |
| 304R | Esc*c0P | Print the first rule |
| 304S | Esc&a540h980V | Position the second rule at (540,980) decipoints |
| 304T | Esc*c0P | Print the second rule |
| 304U | Esc&a1200v540H | Position for first line of text at (540,1200) decipoints |
| 304V | Esc&f1X | Stop Macro Definition |

| Command | Description |
|---|---|
| Esc&f0X | Start macro definition |
| Esc&f1X | Stop macro definition |
| Esc&f2X | Execute macro |
| Esc&f3X | Call macro |
| Esc&f4X | Enable macro for automatic overlay |
| Esc&f5X | Disable automatic overlay |
| Esc&f6X | Delete all macros |
| Esc&f7X | Delete all temporary macros |
| Esc&f8X | Delete macro |
| Esc&f9X | Make macro temporary |
| Esc&f10X | Make macro permanent |
| Esc&f11X | Macro Security |

Fig. 5

| | | |
|---|---|---|
| Esc&f1Y | Specify the Macro ID as 1 | ← 604A |
| Esc&f11X [Macro Security data] | Macro Security | ← 604B |
| Esc&f0X | Start the Macro Definition | ← 604C |
| Esc&a540h360V | Position logo at (540,360) decipoints in the coordinate system | ← 604D |
| Esc*t150R | Set graphics resolution to 150 dots-per-inch | ← 604E |
| Esc*r1A | Start raster image of logo | ← 604F |
| Esc*b60W [Raster data] | Send the first raster line | ← 604G |
| ... | | ← 604H |
| | | ← 604I |
| Esc*b60W [Raster data] | Send the last raster line | ← 604J |
| Esc*rC | Stop raster graphics | ← 604K |
| Esc&a540h780V | Position for lettering at (540,780) decipoints | ← 604L |
| Esc(1X | Select font with ID of 1 | ← 604M |
| ABC Corp. | Text | ← 604N |
| Post Office Box 15 | Text | ← 604O |
| Fred, Texas 83707 | Text | ← 604P |
| Esc&a540h960V | Position first rule at (540,960) decipoints | ← 604Q |
| Esc*c10v4680H | Set rule height and width | ← 604R |
| Esc*c0P | Print the first rule | ← 604S |
| Esc&a540h980V | Position the second rule at (540,980) decipoints | ← 604T |
| Esc*c0P | Print the second rule | ← 604U |
| Esc&a1200v540H | Position for first line of text at (540,1200) decipoints | ← 604V |
| Esc&f1X | Stop Macro Definition | ← 604W |

CONTROLLING PRINTER MACRO USAGE BASED ON PRINTER IDENTIFICATION INFORMATION

THE FIELD OF THE INVENTION

The present invention generally relates to printers, and more particularly to controlling printer macro usage based on printer identification information.

BACKGROUND OF THE INVENTION

Printer macros (also referred to as electronic forms or eforms) are typically stored in a file system or working memory (RAM) of a printer, and can be executed by the printer to perform a variety of functions. For example, one common use of a printer macro is to place a company logo on each page of a printed document. Macros are typically invoked by a printer in response to a request in a print job that specifies an identifier for the desired printer macro. By storing information for commonly used functions in the printer in the form of a macro, the information need not be transmitted to the printer for each print job.

A problem exists of users illegally copying printer macros from one printer file system to another printer file system. Printer macros are typically stored on a disk or dual in-line memory modules (DIMM's) within a printer. As printers adopt removable storage media, such as Compact Flash®, for storing printer resources, such as macros or eforms, it becomes increasingly important to protect these resources from unauthorized distribution and use. In general, most printer architectures dictate that data stored on Compact Flash® is to be stored on a proprietary file system, such as the LynxOS® file system, in order to be usable by printer firmware. As such, printer resources that were once provided with some level of protection by virtue of being stored in a proprietary data format on a storage medium whose low-level data organization was also proprietary, become as unprotected on a removable storage medium as files stored on client computer file systems.

SUMMARY OF THE INVENTION

One form of the present invention provides a method of controlling usage of printer macros stored in a printer. The method includes detecting a request for use of a first one of the printer macros by a print job. Printer identification information contained in the first printer macro is compared to a printer identifier stored in the printer. Usage of the first printer macro by the printer is controlled based on the comparison.

BRIEF DESCRIPTION OF THE DRAWINGS

FIG. 2 is a diagram illustrating a set of PCL5® printer macro commands.

FIG. 3 is a diagram illustrating an example PCL5® printer macro.

FIG. 5 is a diagram illustrating an enhanced set of PCL5® printer macro commands, including a macro security command according to one embodiment of the present invention.

FIG. 6 is a diagram illustrating an example PCL5® printer macro, including a macro security command according to one embodiment of the present invention.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
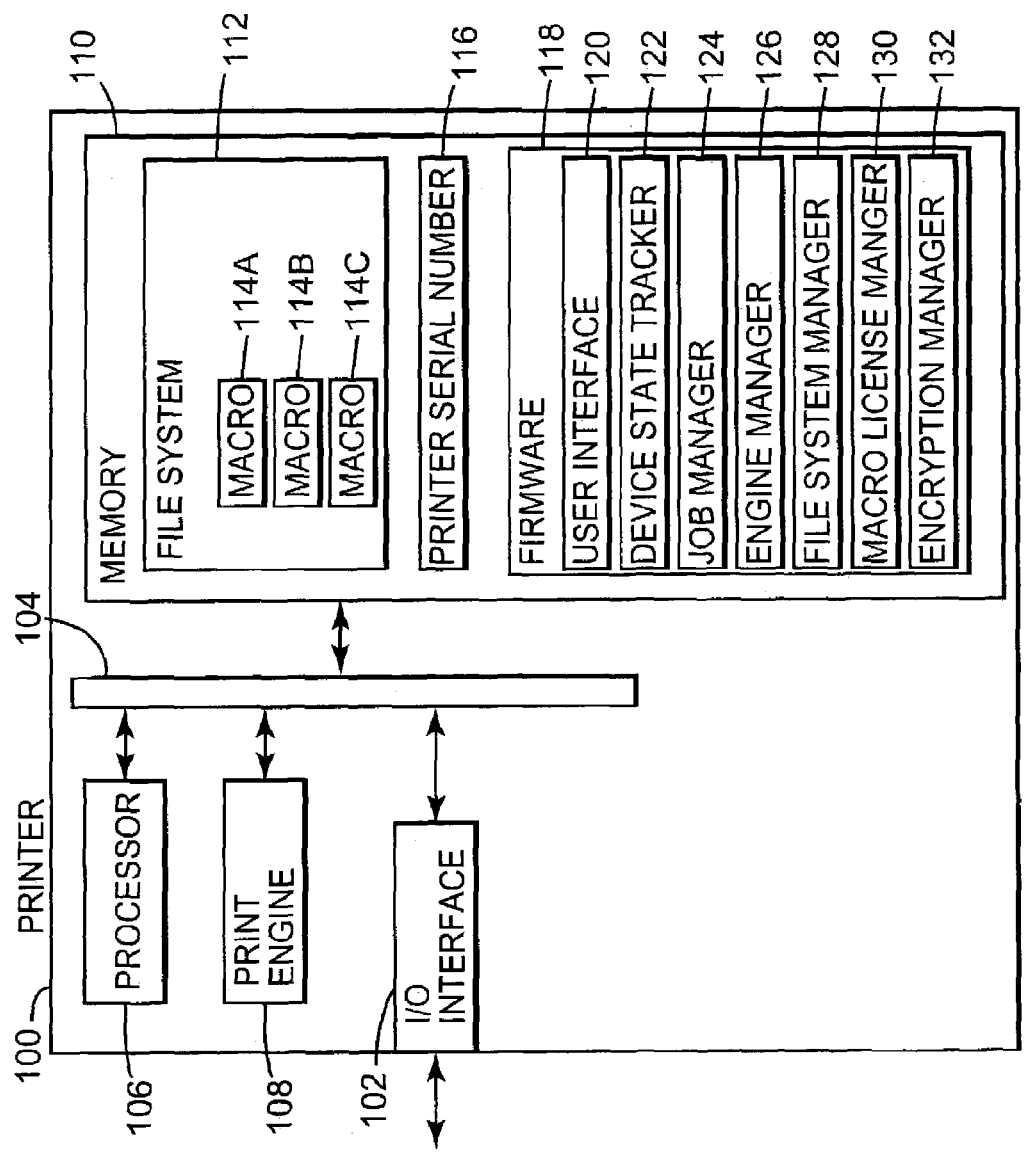
FIG. 1 is a block diagram illustrating major components of a printer configured to provide printer macro security according to one embodiment of the present invention.

FIG. 1 is a block diagram illustrating major components of a print apparatus or printer 100 configured to provide printer macro security according to one embodiment of the present invention. Printer 100 includes input/output (I/O) interface 102, processor 106, print engine 108, and memory 110, which are communicatively coupled together via bus 104. Printer 100 is configured to be coupled to one or more computers (not shown) via I/O interface 102. In one embodiment, I/O interface 102 is a serial interface, such as a universal serial bus (USB) interface. In another embodiment, I/O interface 102 is a network interface. In other embodiments, other types of interfaces may be used, including those for wireless communications.

In one embodiment, print engine 108 is a laser print engine, and includes conventional laser printer elements (not shown) for forming an image on media, such as a laser, a rotating polygonal-mirror to deflect the laser beam, a photoconductive drum, toner dispensers, media handlers, as well as other conventional elements known to those of ordinary skill in the art. It is to be understood that other types of printers and their associated elements can be utilized by the present invention.

In one embodiment, memory 110 includes multiple types of memory, including both volatile and non-volatile memory, such as random access memory (RAM), read-only memory (ROM), and flash memory. In one form of the invention, memory 110 stores a file system 112, a printer identifier (e.g., printer serial number) 116, and firmware 118. A plurality of printer macros 114A-114C (collectively referred to as printer macros 114) are stored in file system 112, and are available for use by a print application in a computer (not shown) coupled to the printer 100. Macros 114 are also referred to as electronic forms or "eforms." Each of the printer macros 114 includes a unique identifier and a set of printer commands. A print job may request that one or more of the macros 114 be used in the job by specifying the unique identifiers of the desired macros 114 in the request. In one embodiment, macros 114 are stored on a removable storage medium, such as Compact Flash®, which may be removed from printer 100 and placed in another printer or other device.

Firmware 118 includes a plurality of firmware modules 120-132, which include instructions that are executed by processor 106. In one embodiment, the firmware modules include user interface 120, device state tracker 122, job manager 124, engine manager 126, file system manager 128, macro license manager 130, and encryption manager 132.

User interface 120 handles receipt and processing of user input information that is input on a front panel (not shown) of printer 100, and handles the display of information to the user. Device state tracker 122 retrieves status information from various hardware components (e.g., sensors) in printer 100 in response to received status inquiries (e.g., how much toner is left in the toner cartridge), and forwards status information to the requesting component. Job manager 124 parses and processes data streams that printer 100 receives from various input/output connections (e.g., I/O interface 102), and invokes other software components as appropriate to complete print jobs. Engine manager 126 controls and provides an interface to print engine 108. File system manager 128 controls and provides an interface to file system 112. File system manager 128 receives file system requests from other software components, converts the requests into an appropriate language to manipulate the file system 112, and returns appropriate data to the requesting component. Macro license manager 130 performs various printer macro security functions, as described in further detail below. Encryption manager 132 performs encryption and decryption functions, as described in further detail below.

In one embodiment, printer 100 provides security for those printer macros 114 that are stored on the local file system 112 by checking for a printer serial number in a requested printer macro 114. In one form of the invention, when a print job requests that one of the printer macros 114 be used, the requested printer macro 114 is validated for use by the presence of a printer serial number in the printer macro 114. In one embodiment, if the printer macro data 114 does not contain a serial number that matches the serial number 116 of printer 100, the print job is rejected.

In one form of the invention, if a printer macro 114 does not include a printer serial number, printer 100 writes its serial number 116 to the printer macro 114. In one embodiment, printer macros 114 are configured to include multiple printer serial numbers based on the licensing agreement established between the customer and the printer macro provider. In one form of the invention, each printer macro 114 includes a field that specifies the maximum number of printer serial numbers that can be stored in the printer macro 114. In one embodiment, printer 100 does not attempt to add its printer serial number 116 to a printer macro 114 when the maximum number of serial numbers has already been attained.

Printer macro security functions are described in further detail below with reference to FIGS. 5-10. But first, various "PCL5®" commands and an example printer macro are described with reference to FIGS. 2-4. "PCL5®" is a printer command language created by Hewlett-Packard that comprises a series of escape sequence codes, which are used to control printer features. Although one embodiment of the present invention is described in the context of PCL5®, it will be understood by persons of ordinary skill in the art that printer macros or eforms may be defined in a variety of printer languages, and that other embodiments of the invention may use other printer languages.

FIG. 2 is a diagram illustrating a set of PCL5® printer macro commands 200. The commands 200 are shown in a table that includes two columns 202A and 202B, and eleven rows 204A-204K (collectively referred to as rows 204). Each row 204 includes a printer macro command in column 202A, and a corresponding description of that command in column 202B. Each of the printer macro commands is in the form "Esc&f#X," where the value for the "#" character varies from command to command. Printer macro commands 200 are described in further detail below with reference to FIGS. 3 and 4.

FIG. 3 is a diagram illustrating an example PCL5® printer macro 300. The example printer macro 300 is used by printer 100 to place a company logo on each page of a printed document. It will be understood by persons of ordinary skill in the art that macro 300 is shown in human-readable form in FIG. 3, and that a file containing an actual macro definition would not represent the printer commands in the same manner.

Printer macro 300 is shown in a table that includes two columns 302A and 302B, and twenty-two rows 304A-304V (collectively referred to as rows 304). Each row 304 includes a PCL5® command, or text, in column 302A, and a corresponding description in column 302B. The PCL5® commands in macro 300 include some of the printer macro commands 200 shown in FIG. 2 (e.g., in rows 304B and 304V), as well as other PCL5® commands. The first row 304A includes the command "Esc&f1Y," which specifies that the Macro ID of macro 300 is "1". A print job can request that macro 300 be used in the job by specifying the Macro ID of "1" in the request.

Row 304B of macro 300 includes the command "ESC&f0X," which identifies the start of the macro definition. Row 304V includes the command "ESC&f1X," which identifies the end of the macro definition. Rows 304C-304U include commands and text for causing the printer 100 to print a company logo (i.e., ABC Corp.'s logo) on a printed page. The illustrated command sequence to perform this function of printing a logo will be understood by persons of ordinary skill in the art. The specific commands used to print a logo are not relevant to the provision of macro security according to one embodiment, and are, therefore, not described in further detail herein.

Figure 4:
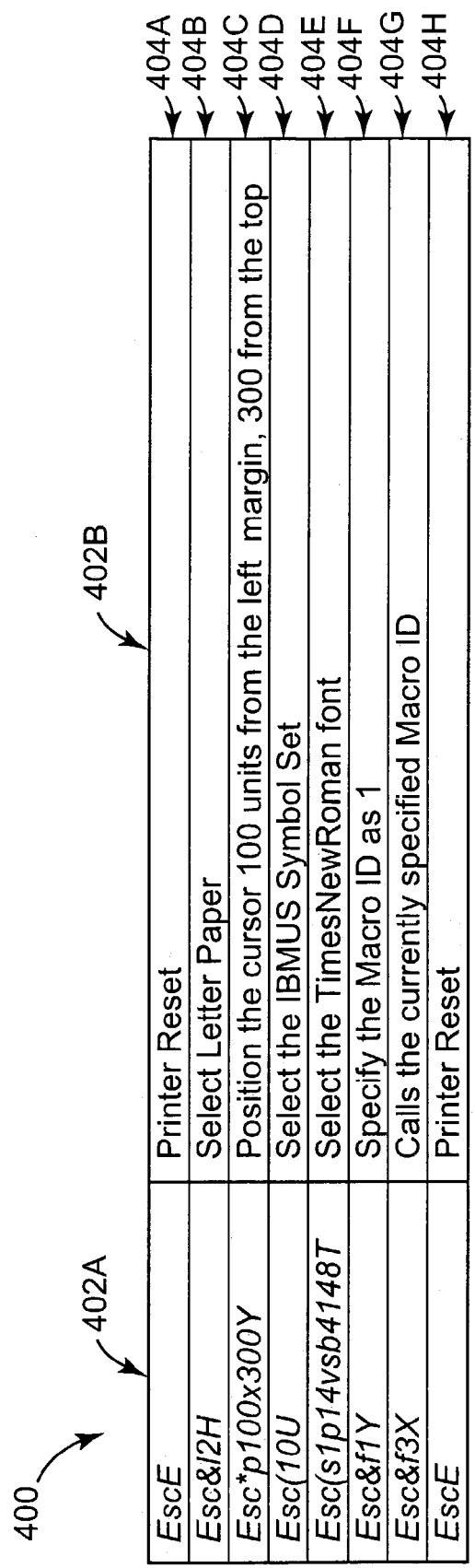
FIG. 4 is a diagram illustrating an example set of PCL5® commands in a print job for invoking the example printer macro shown in FIG. 3.

FIG. 4 is a diagram illustrating an example set of PCL5® commands 400 in a print job for invoking the example printer macro 300 shown in FIG. 3. In one embodiment, the commands 400 would be sent in a print job from a client device (e.g., computer) to printer 100. Commands 400 are shown in a table that includes two columns 402A and 402B, and eight rows 404A-404H (collectively referred to as rows 404). Each row 404 includes a PCL5® command in column 402A, and a corresponding description of that command in column 402B. Rows 404A-404E include various commands for configuring and preparing printer 100 to use macro 300 (e.g., selecting a paper type, selecting a symbol set, selecting a font, etc.). Row 404F includes the command "Esc&f1Y," which sets the current Macro ID to "1". Row 404G includes the command "Esc&f3X," which issues a call for a macro having an ID that matches the currently specified Macro ID (i.e., Macro ID=1). Since the printer macro 300 shown in FIG. 3 has a Macro ID of "1", the call in row 404G requests that printer 100 invoke macro 300. Row 404H includes the command "EscE," which causes printer 100 to be reset after the macro 300 has been executed.

FIG. 5 is a diagram illustrating an enhanced set of PCL5® printer macro commands 500, including a macro security command according to one embodiment of the present invention. The commands 500 are shown in a table that includes two columns 502A and 502B, and twelve rows 504A-504L (collectively referred to as rows 504). Each row 504 includes a printer macro command in column 502A, and a corresponding description of that command in column 502B. The printer macro commands in rows 504A-504K are the same as the printer macro commands shown in FIG. 2. As shown in row 504L of FIG. 5, a macro security command (Esc&f11X) has been added to the set for macro security functionality. The macro security command is described in further detail below with reference to FIGS. 6-10.

FIG. 6 is a diagram illustrating an example PCL5® printer macro 600, including a macro security command according to one embodiment of the present invention. Printer macro 600 is shown in a table that includes two columns 602A and 602B, and twenty-three rows 604A-604W (collectively referred to as rows 604). Each row 604 includes a PCL5® command, or text, in column 602A, and a corresponding description in column 602B. Printer macro 600 is the same as printer macro 300 (shown in FIG. 3), with the exception that a macro security command (Esc&f11X) 606A and a macro security data field 606B have been added (in row 604B) for macro security functionality. In one form of the invention, the macro security data field 606B is used to store printer identification information (e.g., printer serial number(s)).

Figure 7:
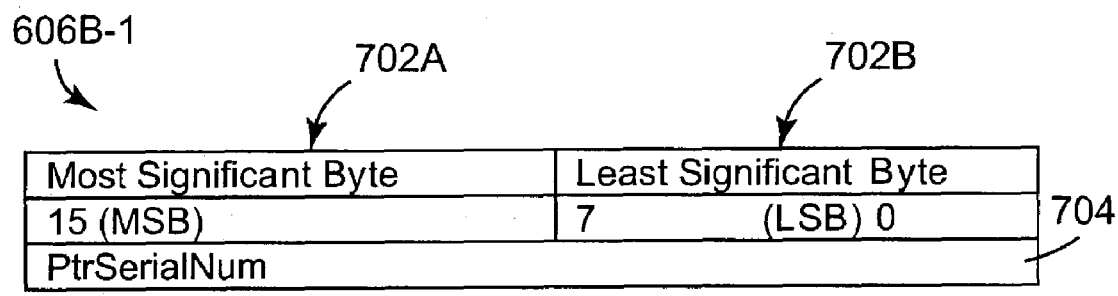
FIG. 7 is a diagram illustrating a macro security data field according to one embodiment of the present invention.

In one embodiment, each of the printer macros 114 in the printer file system 112 (shown in FIG. 1) includes a macro security command 606A and a macro security data field 606B. As will be understood by persons of ordinary skill in the art, the provision of a macro security command 606A and a macro security data field 606B in a printer macro 114 may vary depending upon the type of macro and the printer language used. One embodiment of a macro security data field 606B is shown in FIG. 7, and is identified by reference number 606B-1. Another embodiment of a macro security data field 606B is shown in FIG. 9, and is identified by reference number 606B-2. These embodiments of macro security data field 606B are described below with reference to FIGS. 7-10.

FIG. 7 is a diagram illustrating a macro security data field 606B-1 according to one embodiment of the present invention. Macro security data field 606B-1 is represented by a table that includes two columns 702A and 702B, and a printer serial number (PtrSerialNum) field 704. The printer serial number field 704 includes two 8-bit bytes, which are a least significant byte (LSB—bits 0-7) and a most significant byte (MSB—bits 8-15). Column 702A corresponds to the most significant byte, and column 702B corresponds to the least significant byte. In one form of the invention, the printer serial number field 704 is used to store printer identification information (e.g., printer serial number(s)).

Figure 8:
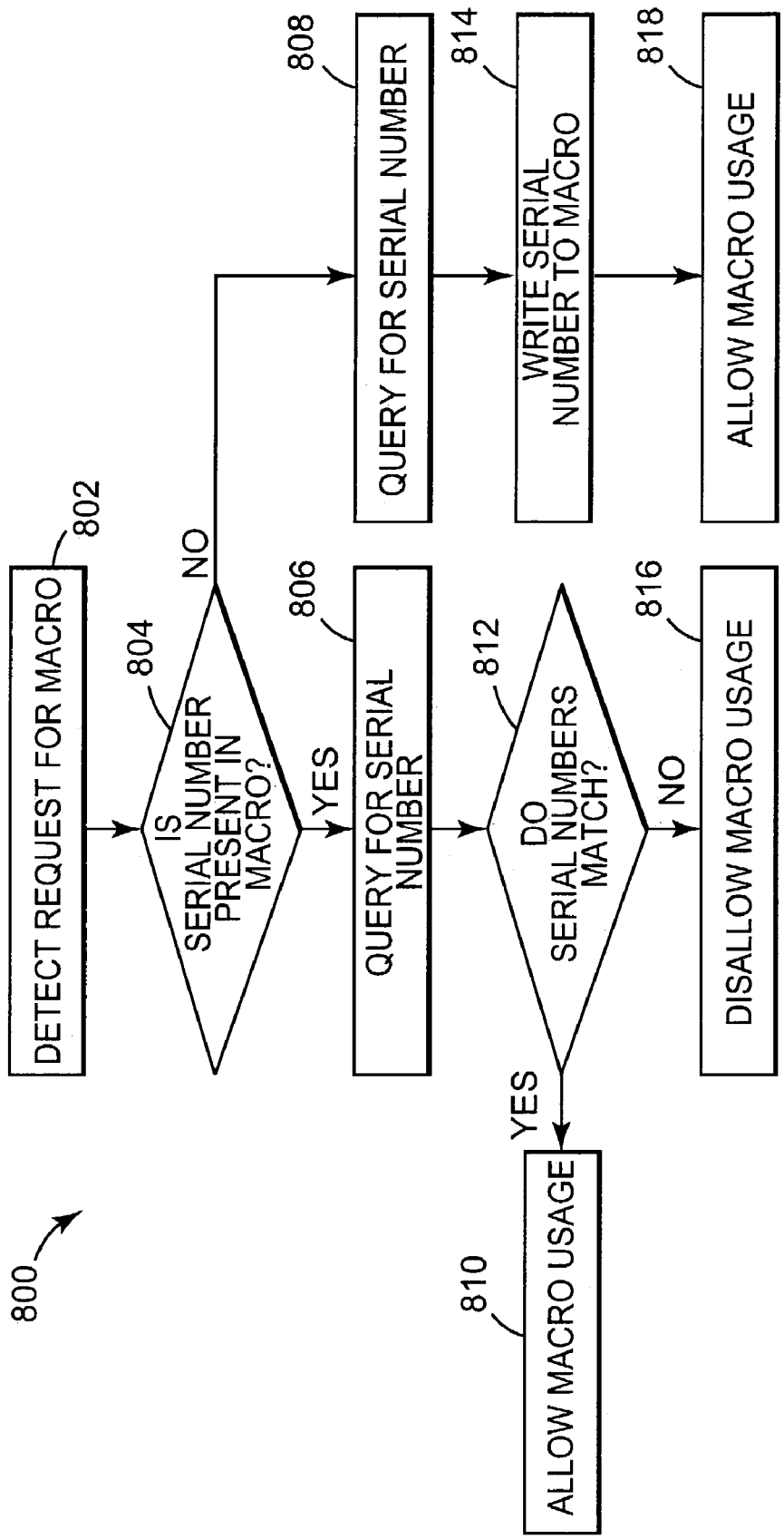
FIG. 8 is a flow diagram illustrating a printer macro security method performed by the printer shown in FIG. 1 according to one embodiment of the present invention.
Figure 9:
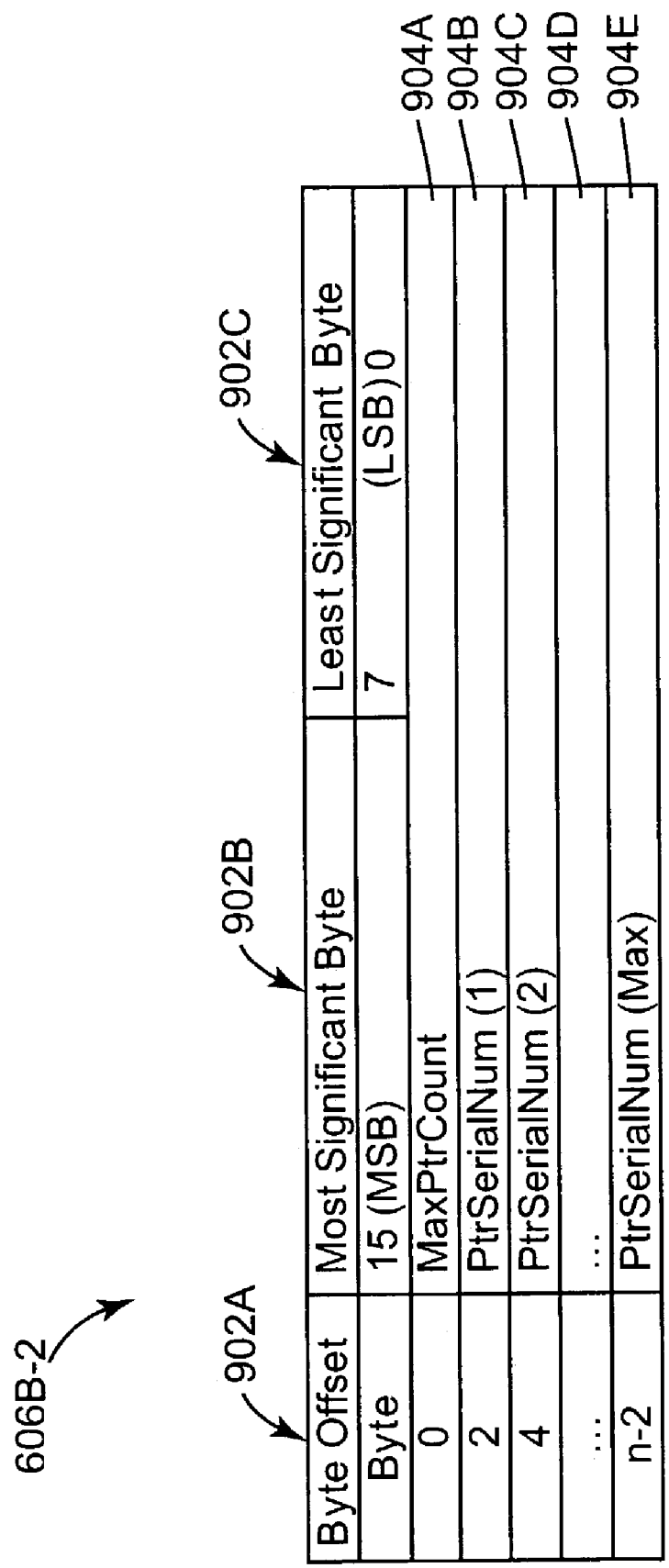
FIG. 9 is a diagram illustrating a macro security data field according to another embodiment of the present invention.

FIG. 8 is a flow diagram illustrating a printer macro security method 800 performed by printer 100 (FIG. 1) according to one embodiment of the present invention. In step 802, job manager 124 detects that a print job has requested one of the printer macros 114 in file system 112. In step 804, job manager 124 invokes macro license manager 130, which checks the requested printer macro 114 for the presence of a serial number in the macro security data field 606B-1 (FIG. 7). If a serial number is present, in step 806, macro license manager 130 issues a query for the serial number 116 of printer 100, and the serial number 116 is provided to macro license manager 130 by device state tracker 122 in response to the query.

In step 812, macro license manager 130 compares the printer serial number 116 to the serial number in the macro security data field 606B-1 of the requested printer macro 114, and determines if the values match. If the values match, in step 810, macro license manager 130 informs Job manager 124 that the requested printer macro 114 can be used in the print job. If the values do not match, in step 816, macro license manager 130 informs job manager 124 that the requested printer macro 114 cannot be used in the print job. In one embodiment, if the job manager 124 receives an indication that a requested printer macro 114 cannot be used in a print job, the job manager 124 rejects the print job and invokes user interface 120 to inform the user that the print job cannot be completed.

If it is determined in step 804 that the requested printer macro 114 does not include a printer serial number in the macro security data field 606B-1, the method moves to step 808. In step 808, macro license manager 130 issues a query for the serial number 116 of printer 100, and the serial number 116 is provided to macro license manager 130 by device state tracker 122 in response to the query. In step 814, macro license manager 130 writes the printer serial number 116 to the macro security data field 606B-1 of the requested printer macro 114, and saves the modified printer macro 114 back to the file system 112. In step 818, macro license manager 130 informs job manager 124 that the requested printer macro 114 can be used in the print job.

Sophisticated users may attempt to copy a printer macro 114 from one printer to another, and modify the serial number 116 in the macro security data field 606B-1 of the printer macro 114. In one embodiment, the serial number data in the macro security data field 606B-1 is encrypted with a unique key by encryption manager 132 to protect the printer macro 114 from serial number manipulation attempts. Encryption manager 132 is invoked by macro license manager 130 to decrypt the serial number data in the macro security data field 606B-1 prior to making the serial number comparison in step 812 of method 800.

FIG. 9 is a diagram illustrating a macro security data field 606B-2 according to another embodiment of the present invention. Macro security data field 606B-2 is represented by a table that includes three columns 902A-902C, and five sub-fields 904A-904E (collectively referred to as sub-fields 904). The first column 902A identifies byte offset information for each sub-field 904. The byte offset information identifies the position of the first byte of a given sub-field 904 relative to the first byte of the macro security data field 606B-2 (i.e., byte 0). As shown in FIG. 9, each sub-field 904 starts on an even byte offset and consumes two 8-bit bytes, including a least significant byte (LSB—bits 0-7) and a most significant byte (MSB—bits 8-15). Column 902B corresponds to the most significant byte, and column 902C corresponds to the least significant byte.

In one form of the invention, sub-field 904A is a maximum printer count (MaxPtrCount) sub-field, which begins at byte offset zero, and consumes two bytes. In one embodiment, sub-fields 904B-904E are printer serial number (PtrSerialNum) sub-fields that each begin at an even byte offset and consume two bytes. In one form of the invention, the printer serial number sub-fields 904B-904E are used to store printer identification information (e.g., printer serial number(s)). In one embodiment, the maximum printer count sub-field 904A includes a value that indicates the maximum number of printer serial numbers that can be written to sub-fields 904B-904E. The number of printer serial number sub-fields 904B-904E may vary from macro to macro, depending upon the number of licenses purchased for each macro.

Figure 10:
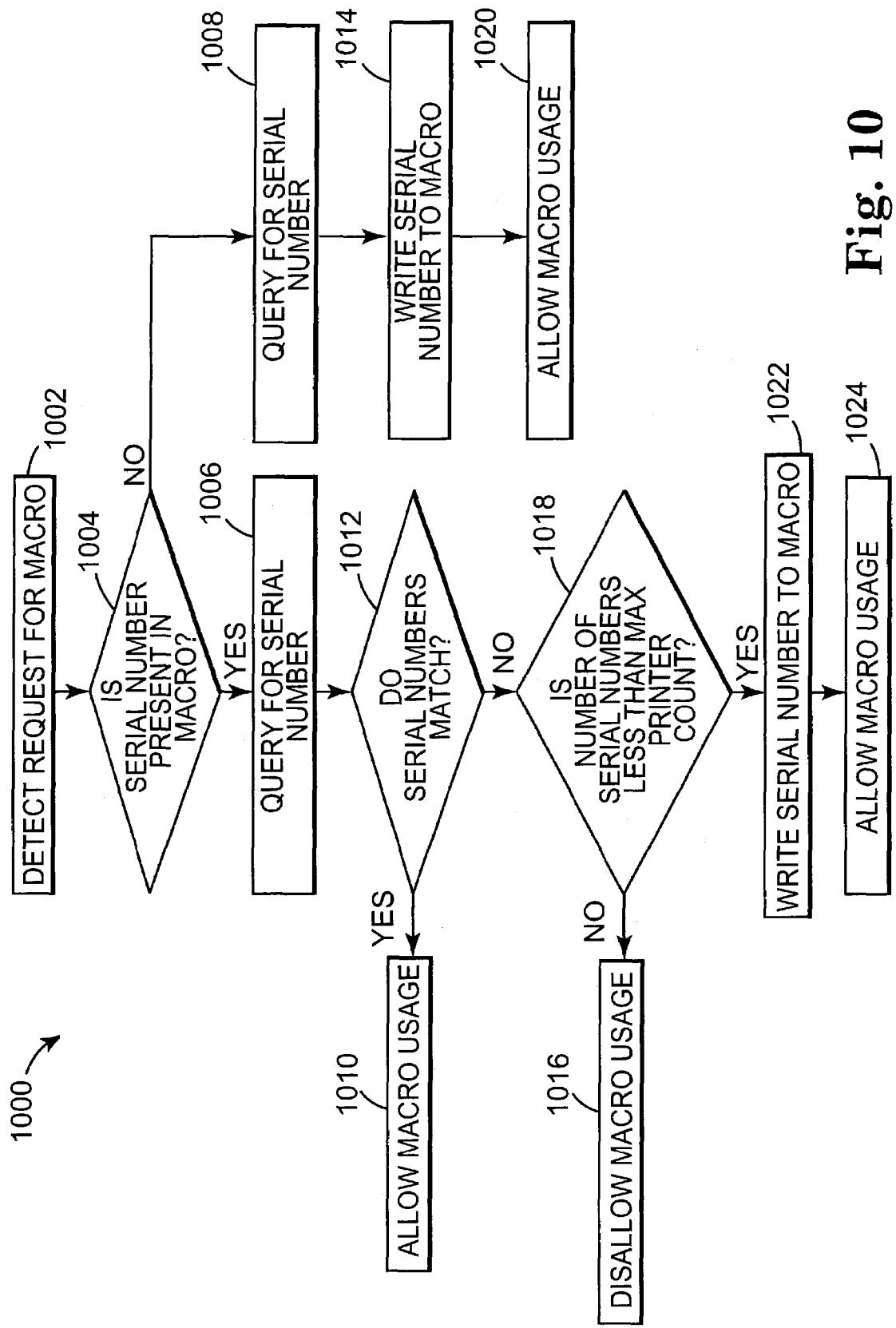
FIG. 10 is a flow diagram illustrating a printer macro security method performed by the printer shown in FIG. 1 according to another embodiment of the present invention.

FIG. 10 is a flow diagram illustrating a printer macro security method 1000 performed by printer 100 (FIG. 1) according to another embodiment of the present invention. In step 1002, job manager 124 detects that a print job has requested one of the printer macros 114 in file system 112. In step 1004, job manager 124 invokes macro license manager 130, which checks the requested printer macro 114 for the presence of a serial number in the macro security data field 606B-2 (FIG. 9).

If it is determined in step 1004 that the requested printer macro 114 does not include a printer serial number in the macro security data field 606B-2, the method moves to step 1008. In step 1008, macro license manager 130 issues a query for the serial number 116 of printer 100, and the serial number 116 is provided to macro license manager 130 by device state tracker 122 in response to the query. In step 1014, macro license manager 130 writes the printer serial number 116 to the macro security data field 606B-2 in the requested printer macro 114, and saves the modified printer macro 114 back to the file system 112. In step 1020, macro license manager 130 informs job manager 124 that the requested printer macro 114 can be used in the print job.

If it is determined in step 1004 that a serial number is present in the requested printer macro 114, in step 1006, macro license manager 130 issues a query for the serial number 116 of printer 100, and the serial number 116 is provided to macro license manager 130 by device state tracker 122 in response to the query. In step 1012, macro license manager 130 compares the printer serial number 116 to the serial number(s) in the macro security data field 606B-2 of the requested printer macro 114, and determines if there is a match. If there is a match, in step 1010, macro license manager 130 informs job manager 124 that the requested printer macro 114 can be used in the print job. If there is not a match, in step 1018, macro license manager 130 determines whether the number of printer serial numbers in the macro security data field 606B-2 is less than the value specified in the maximum printer count sub-field 904A. If the number of printer serial numbers in the macro security data field 606B-2 is not less than the value specified in sub-field 904A, in step 1016, macro license manager 130 informs job manager 124 that the requested printer macro 114 cannot be used in the print job. In one embodiment, if the job manager 124 receives an indication that a requested printer macro 114 cannot be used in a print job, the job manager 124 rejects the print job and invokes user interface 120 to inform the user that the print job cannot be completed.

If it is determined in step 1018 that the number of printer serial numbers in macro security data field 606B-2 is less than the value specified in sub-field 904A, the method moves to step 1022. In step 1022, macro license manager 130 writes the printer serial number 116 to the macro security data field 606B-2 in the requested printer macro 114, and saves the modified printer macro 114 back to the file system 112. In step 1024, macro license manager 130 informs job manager 124 that the requested printer macro 114 can be used in the print job.

In one embodiment, the serial number data in macro security data field 606B-2 and the maximum number of printers data in sub-field 904A are both encrypted with a unique key by encryption manager 132 to protect the printer macro 114 from manipulation attempts. Encryption manager 132 is then invoked by macro license manager 130 to decrypt the data prior to making the comparisons in step 1012 and 1018 of method 1000.

It will be understood by a person of ordinary skill in the art that functions performed by printer 100 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

One form of the present invention provides a security mechanism to deter printer macro licensing violations, which involves incorporating a serial number of a printer into a printer macro's data structure. One form of the invention provides printer macro security by making a change to conventional printer firmware, and to conventional printer macro data structures. One embodiment of the present invention provides a printer macro security mechanism that is contained within a printer device. In one embodiment, printer macro entities are modified to allow for the storage of a printer serial number(s). One embodiment of the invention helps to prevent use of illegal copies of printer macros by "serializing" a printer macro to the first printer that used the printer macro, thereby configuring the printer macro to be used only on that one printer. In another embodiment, printer macros are "serialized" to a plurality of printers, so that the printer macros are useable on that plurality of printers, but not on other printers.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of controlling usage of printer macros stored in a printer, the method comprising:
   detecting a request for use of a first one of the printer macros by a print job, wherein the first printer macro includes a first value representing a maximum number of printers authorized to use the first printer macro;
   comparing printer identification information contained in the first printer macro to a printer identifier stored in the printer; and
   controlling usage of the first printer macro by the printer based on the comparison.

2. The method of claim 1, wherein the printer identification information includes at least one printer serial number, and the printer identifier is a printer serial number.

3. The method of claim 1, and further comprising:
   preventing use of the first printer macro by the printer if the printer identifier does not match data in the printer identification information.

4. The method of claim 1, and further comprising:
   identifying whether the first printer macro includes printer identification information; and
   storing the printer identifier in the first printer macro if the first printer macro does not include printer identification information.

5. The method of claim 1, and further comprising:
   identifying a number of printers currently identified in the printer identification information; and
   comparing the identified number of printers to the first value.

6. The method of claim 5, and further comprising:
   storing the printer identifier in the first printer macro if the identified number of printers is less than the first value.

7. The method of claim 1, wherein the printer identification information is encrypted, the method further comprising:

decrypting the printer identification information prior to comparing the printer identification information to the printer identifier.

8. A print apparatus comprising;
a print engine;
at least one memory for storing a printer macro and a printer identifier, the printer macro including printer identification information, the winter identification information identifying a plurality of printers authorized to use the printer macro; and
a printer macro manager for comparing the printer identifier to the printer identification information, and providing an indication of the permissibility of usage of the printer macro by the print apparatus based on the comparison.

9. The print apparatus of claim 8, wherein the printer identification information includes at least one printer serial number, and the printer identifier is a printer serial number.

10. The print apparatus of claim 8, wherein the printer macro manager is configured to indicate that the printer macro is not to be used by the print apparatus if the printer identifier does not match data in the printer identification information.

11. The print apparatus of claim 8, wherein the printer macro manager is configured to identify whether the printer identification information includes the printer identifier, and store the printer identifier in the printer macro if the printer identification information does not include the printer identifier.

12. The print apparatus of claim 8, wherein the printer macro includes a first value representing a maximum number of printers authorized to use the printer macro, and wherein the printer macro manager is configured to identify a number of printers currently identified in the printer identification information, and compare the identified number of printers to the first value.

13. The print apparatus of claim 12, wherein the printer macro manager is configured to store the printer identifier in the printer macro if the printer identification information does not include the printer identifier and if the identified number of printers is less than the first value.

14. The print apparatus of claim 12, wherein the printer identification information and the first value are encrypted.

15. The print apparatus of claim 8, wherein the printer macro is stored on a removable storage medium.

16. The print apparatus of claim 15, wherein the removable storage medium is a Compact Flash® medium.

17. A print apparatus comprising:
print engine means for fanning an image on media;
storage means for storing a printer macro and a printer identifier, the printer macro including printer identification information, the printer identification information identifying a plurality of printers authorized to use the printer macro;
means for comparing the printer identifier to the printer identification information; and
means for controlling usage of the printer macro by the print apparatus based on the comparison.

18. The print apparatus of claim 17, wherein the means for controlling is configured to prevent usage of the printer macro if the printer identifier does not match data in the printer identification information.

19. The print apparatus of claim 17, wherein the storage means includes removable storage means for storing the printer macro.

20. The print apparatus of claim 17, wherein the printer macro includes a first value representing a maximum number of printers authorized to use the printer macro, and wherein the means for controlling further comprises:
means for identifying a number of printers currently identified in the printer identification information;
means for comparing the identified number of printers to the first value; and
means for storing the printer identifier in the printer macro if the printer identification information does not include the printer identifier and if the identified number of printers is less than the first value.

21. A computer-readable medium having computer-executable instructions for performing a method of controlling usage of a macro stored in a printer, the method comprising:
detecting a request for use of the macro by a prim job, wherein the macro includes a first value representing a maximum number of printers authorized to use the macro;
comparing printer identification information contained in the macro to a printer identifier stored in the printer; and
controlling usage of the macro by the printer based on the comparison.

22. The computer-readable medium of claim 21, wherein the method further comprises:
preventing use of the macro by the printer if the printer identifier does not match data in the printer identification information.

23. The computer-readable medium of claim 21, wherein the method further comprises:
identifying whether the printer identification information includes the printer identifier; and
storing the printer identifier in the macro if the printer identification information does not include the printer identifier.

24. The computer-readable medium of claim 21, wherein the method further comprises:
identifying a number of printers currently identified in the printer identification information;
comparing the identified number of printers to the first value; and
storing the printer identifier in the macro if the identified number of printers is less than the first value.

* * * * *

UNITED STATES PATENT AND TRADEMARK OFFICE
CERTIFICATE OF CORRECTION

PATENT NO. : 7,408,656 B2  
APPLICATION NO. : 10/385021  
DATED : August 5, 2008  
INVENTOR(S) : Curtis Reese et al.

It is certified that error appears in the above-identified patent and that said Letters Patent is hereby corrected as shown below:

In column 9, line 4, in Claim 8, delete "comprising;" and insert -- comprising: --, therefor.

In column 9, line 8, in Claim 8, delete "winter" and insert -- printer --, therefor.

In column 9, line 50, in Claim 17, delete "fanning" and insert -- forming --, therefor.

In column 10, line 27, in Claim 21, delete "prim" and insert -- print --, therefor.

Signed and Sealed this

Fourth Day of August, 2009

JOHN DOLL  
*Acting Director of the United States Patent and Trademark Office*